United States Patent [19]

Krueger et al.

[11] Patent Number: 4,675,585
[45] Date of Patent: Jun. 23, 1987

[54] ELECTRIC VEHICLE SPEED CONTROL

[75] Inventors: William R. Krueger, West Allis, Wis.; Gerald N. McAuliffe, Lincoln, Nebr.; George A. Schlageter, Mequon, Wis.

[73] Assignee: Outboard Marine Corporation, Waukegan, Ill.

[21] Appl. No.: 648,147

[22] Filed: Sep. 7, 1984

[51] Int. Cl.$^4$ .............. H02P 5/06; H02P 5/16
[52] U.S. Cl. .................... 318/358; 318/338; 318/139; 318/359
[58] Field of Search ............. 318/250, 251, 252, 139, 318/305, 338, 347, 349, 350, 351, 357, 358, 359, 420, 533, 534, 536, 537, 405, 406

[56] References Cited

U.S. PATENT DOCUMENTS

| | | | |
|---|---|---|---|
| 3,947,738 | 3/1976 | Oliver | 318/341 |
| 3,950,684 | 4/1976 | Peterson | 318/405 X |
| 3,974,429 | 8/1976 | Friend et al. | 318/350 |
| 4,019,107 | 4/1977 | Dixon et al. | 318/338 |
| 4,131,832 | 12/1978 | Cavil et al. | 318/358 |
| 4,189,667 | 2/1980 | Boxer | 318/406 X |
| 4,260,937 | 4/1981 | Cavil et al. | 318/359 X |
| 4,272,707 | 6/1981 | Burgener et al. | 318/139 |
| 4,370,603 | 1/1983 | Franz, Jr. et al. | 318/251 X |
| 4,378,517 | 3/1983 | Morton et al. | 318/338 |
| 4,430,605 | 2/1984 | Arnold | 318/305 X |

*Primary Examiner*—William M. Shoop, Jr.
*Assistant Examiner*—Shik Luen Paul Ip
*Attorney, Agent, or Firm*—Michael, Best & Friedrich

[57] ABSTRACT

The electric vehicle driven by a DC motor having a field winding. An electric resistance element can be switched into parallel circuit with the field winding to weaken the field and increase potential motor speed. A relay operates the switch, a Hall-effect switch responsive to motor rotation produces voltage pulses indicative of motor speed. A microcomputer counts pulses in a given time period to determine motor speed and compares the speed with that in the prior period to determine whether the motor speed is increasing or decreasing. The computer is programmed to operate the relay to close the switch as the motor speed increases above a first speed and to open the switch as motor speed subsequently decreases to a second speed lower than said first speed. The computer is programmed to respond to a third speed greater than the first speed to operate the relay to open said switch to prevent overspeed. The computer also responds to a fourth speed lower than the third speed and greater than the first speed to operate the relay to close the switch means subsequent to opening said switch at the third speed, thus restoring field weakening after the overspeed has been corrected.

12 Claims, 6 Drawing Figures

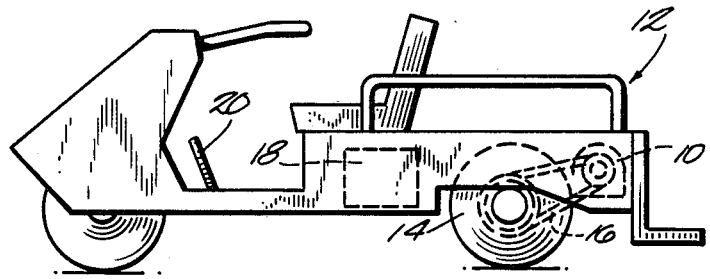
Fig. 1
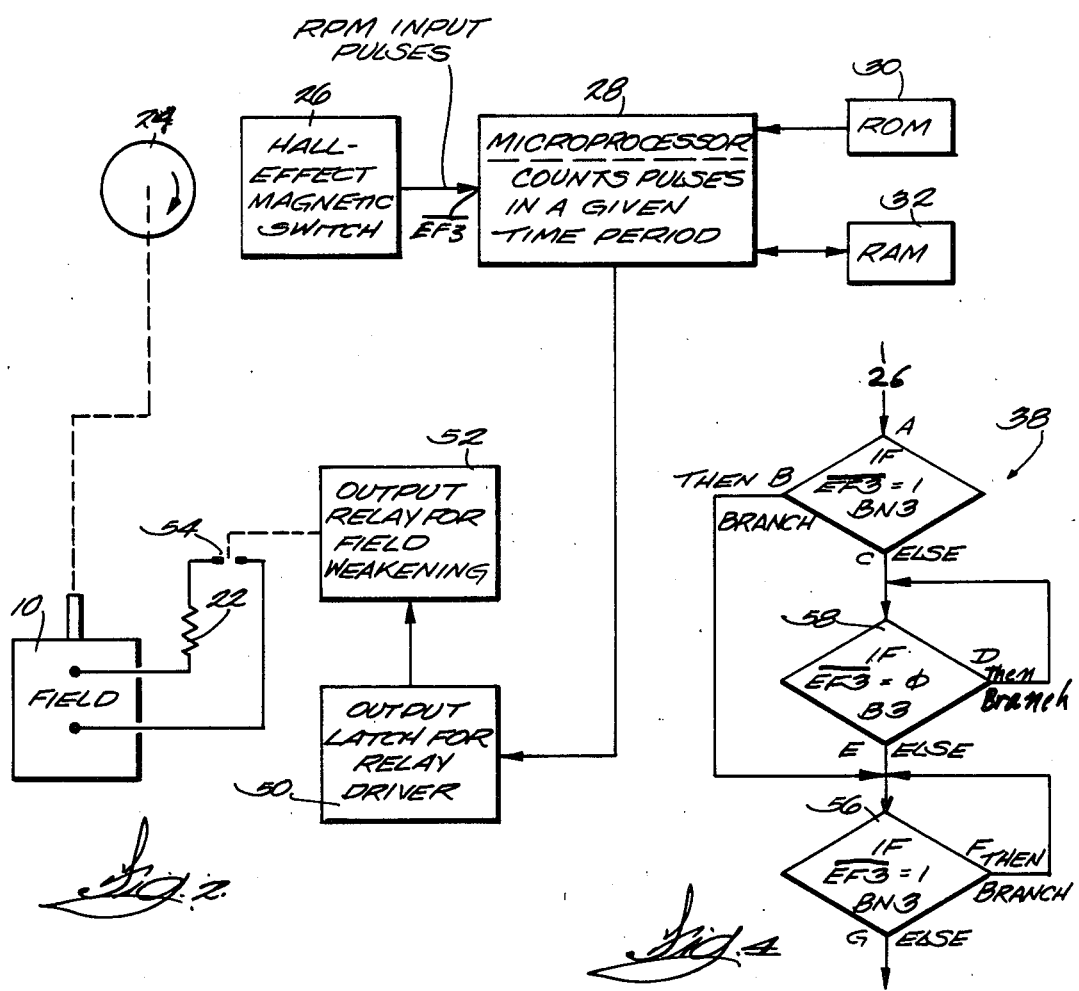
Fig. 2
Fig. 4

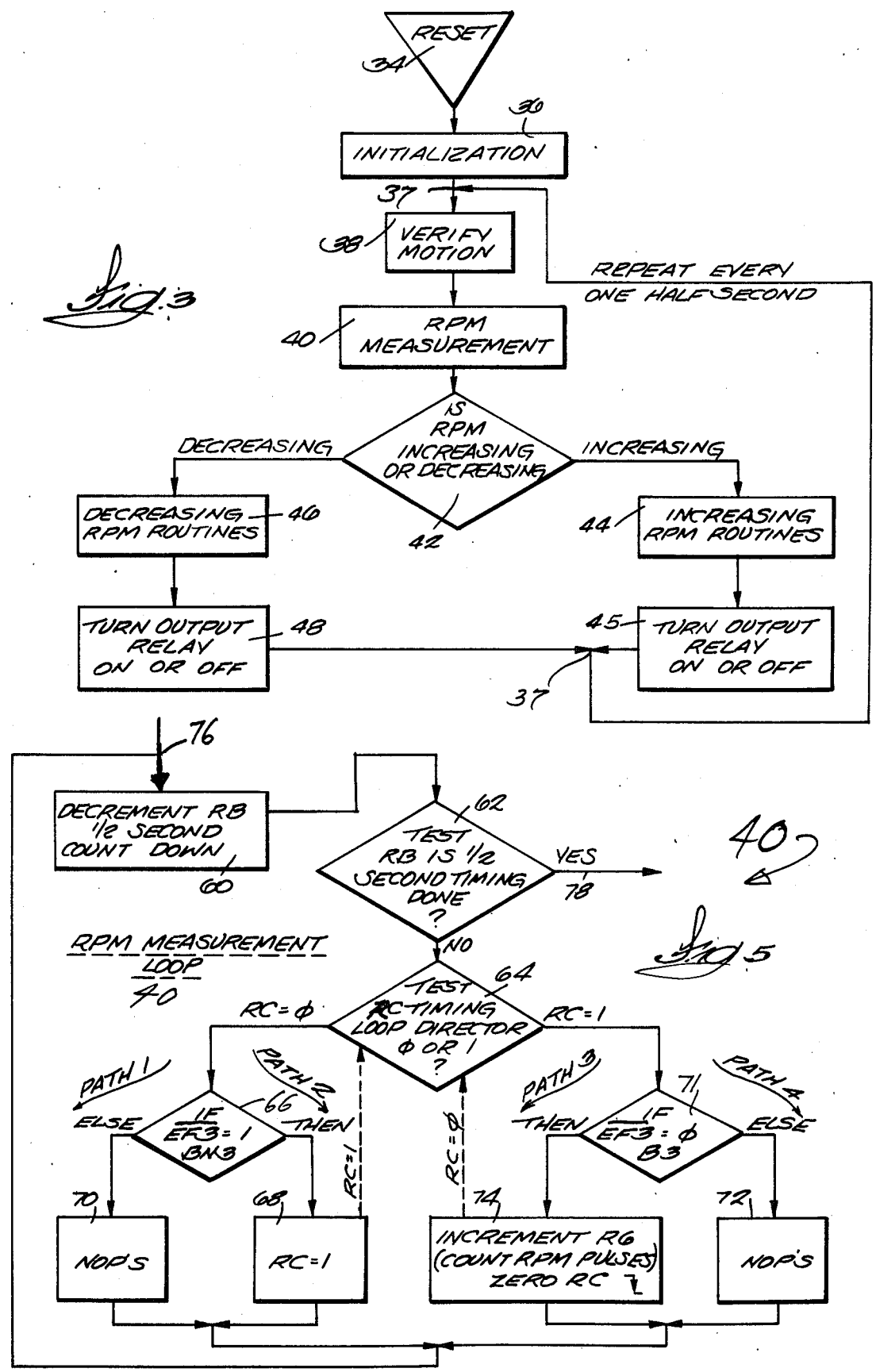

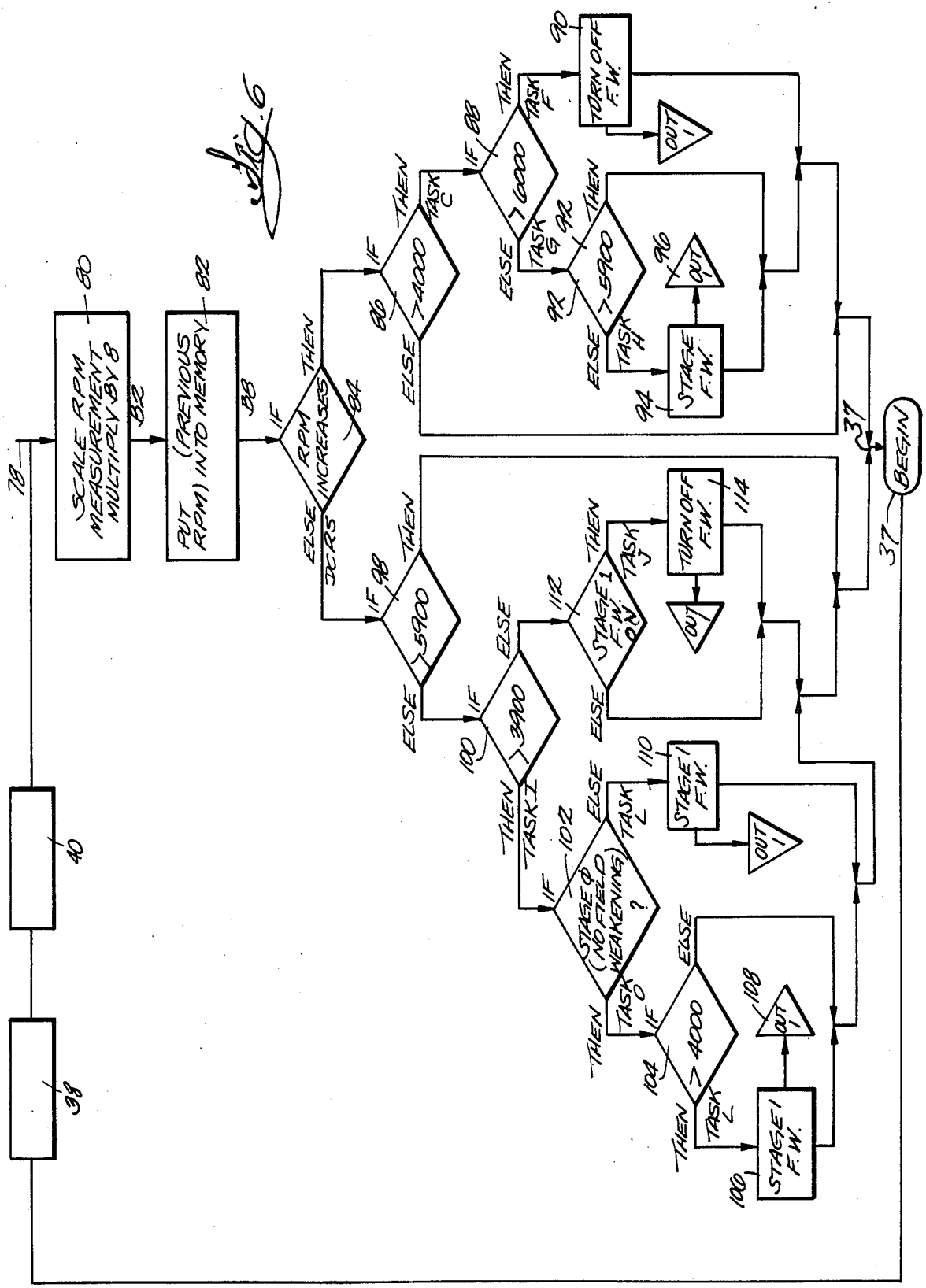

ELECTRIC VEHICLE SPEED CONTROL

BACKGROUND OF THE INVENTION

Electric vehicles generally employ DC electric motors. The speed of the vehicle is changed by changing the rpm of the DC motor. The speed of the motor can be varied by varying the number of batteries connected to the motor. This can be done through a stepping or sequencing type of control, but at some point the maximum speed is reached. With a series or other appropriate DC motor speed can also be varied by placing resistance in parallel with the field winding of the motor. This is called field weakening. As the value of the parallel resistance is decreased, the speed of the motor will increase. In the present construction, a fixed resistor is switched in, that is, placed in parallel with the motor field winding at a certain speed. This, in effect, extends the top speed of the vehicle. A typical speed increase would be to increase the top speed of the vehicle from 13 mph to 20 mph when the resistor is placed in parallel with the field winding. In the past this has been accomplished by a mechanical governor or speed sensor which would close a switch to cause the resistor to be placed in parallel with the field winding of the motor. A second switch would open to remove field weakening if the vehicle speed went too high. Attention is directed to U.S. Pat. No. 4,090,114.

SUMMARY OF THE INVENTION

An object of this invention is to provide an electric vehicle driven by a DC motor having a field winding and an electric resistance element in circuit with the field winding and a switch operative when closed to place the element in parallel with the field winding to weaken the field and increase potential motor speed. A relay operates the switch. A device determines motor speed and determines whether the motor speed is increasing or decreasing and operates the relay to close the switch as the motor speed increases above a first speed and opens the switch as motor speed subsequently decreases to a second speed lower than the first speed.

Another object is to open the switch in response to a third speed greater than the first speed to prevent overspeed of the motor.

Still another object is to close the switch subsequent to opening the switch at the third speed in response to a fourth speed lower than the third speed and greater than the first speed.

Another object of this invention is to provide an electric vehicle driven by a DC motor having a field winding and an electric resistance element in circuit with the field winding and a switch operative when closed to place the element in parallel with the field winding to weaken the field and increase potential motor speed. A relay operates the switch. A device responsive to motor rotation produces voltage pulses indicative of motor speed and a computer counts pulses in a given time period to determine motor speed and by comparison determines whether the motor speed is increasing or decreasing. The computer is programed to operate the relay to close the switch as the motor speed increases above a first speed and opens the switch as motor speed subsequently decreases to a second speed lower than the first speed.

A further object is to program the computer to respond to a third speed greater than the first speed to operate the relay to open the switch to prevent overspeed of the motor.

Still another object is to program the computer to respond to a fourth speed lower than the third speed and greater than the first speed to operate the relay to close the switch subsequent to opening the switch at the third speed.

A still further object is to provide a computer program for such a vehicle responding to absence of voltage pulses indicative of motor rotation to block signal application to the pulse counting means and to prevent operation of the switch.

A further object is to utilize a Hall-effect switch including a rotating element connected to the motor and a sensor connected to the computer to generate the pulses. This arrangement is very compact and is easily programed for different response speeds.

The computer speed comparison to determine whether speed is increasing or decreasing compares the present motor speed with the motor speed determined in the immediately prior time period.

This invention is not limited to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

BRIEF DESCRIPTION OF THE DRAWINGS

FIG. 1 is a simplified representation of an electric vehicle driven by a DC motor powered by storage batteries.

FIG. 2 is a greatly simplified diagram for the DC motor which drives the electric vehicle of FIG. 1 and is provided with a Hall-effect switch applying pulses to the computer which controls the field weakening resistor.

FIG. 3 is a greatly simplified flow chart for the present field weakening and overspeed control arrangement. The flow chart includes motion sensing or verification.

FIG. 4 shows details of the motion sensing portion of the flow chart in FIG. 3.

FIG. 5 shows details of the speed measurement loop depicted as a processing step in FIG. 3.

FIG. 6 is a detailed flow chart for the field weakening and overspeed control function.

DETAILED DESCRIPTION OF THE DRAWINGS

The DC motor 10 in the motor vehicle 12 drives the rear wheels 14 through drive belt 16. The motor is powered by batteries 18. The speed of the vehicle is essentially determined by operating the throttle 20 which, as it is depressed, switches in additional batteries to increase the speed of the vehicle. This is quite customary. The field winding of the standard DC motor tends to limit the maximum vehicle speed obtainable. The speed can be increased by placing a resistor 22 in parallel with the field winding of the DC motor 10 which will permit the speed to continue to increase under the right conditions. The point at which the field weakening resistor 22 is added to the circuit is determined by an on-board computer in accordance with this invention.

The shaft of motor 10 is provided with a multipole vane or permanent magnet rotor. The vanes or the magnets pass close to a sensor in the Hall-effect magnetic switch pickup 26 which processes the alternating signals to provide input pulses to input $\overline{EF3}$ of the microprocessor 28 (an RCA CDP1802CE) which counts the pulses in a given period of time, in this case, 0.5 seconds to set a register (R6) value in the computer. The computer program is stored in a read only memory (ROM) chip 30 (2716 INTEL) while temporary data is stored in a random access memory (RAM) 32 (RCA CDP1824C). Insofar as relevant to this invention, the simplified flow chart of FIG. 3 depicts the computer operation.

The flow chart of FIG. 3 starts with reset or start 34 and the initializing of the circuit at 36 on start-up and other selected times. Then vehicle motion is verified at 38. If there is no motion the logic is prevented from proceding further to thereby avoid possible deviation from the initialized conditions. If there is motion, the speed of the motor is measured at 40. The computer stores two speeds; the previous speed and the present speed. At 42 it is determined whether the speed is increasing or decreasing which will determine which of the two branches will be taken. If the speed is increasing, the logic signal is applied through the increasing speed routines at 44 to ultimately turn output relay 52 on or off at station 45. If the speed is decreasing, the decreasing speed branch processes the signal through the decreasing speed routines at 46 to ultimately turn the output relay 52 (see FIG. 2) on or off at 48. Then the procedure is repeated every half second starting with verification of motion.

Before going into further details of the flow chart, it will be noted that the output of the microprocessor in FIG. 2 is applied to an output latch and relay driver at 50 which in turn actuates an output relay 52 to close contacts 54 and place the resistor 22 in the circuit or to take it out of the circuit if the contacts are open.

Now going back to details of the simplified flow chart shown in FIG. 3, the motion is verified through the logic depicted in FIG. 4. The signal from the Hall-effect switch 26 enters at A. The Hall-effect switch will produce alternate high and low voltage signals, i.e., in computer language alternate 1 and 0 signals. If there is no motion, the signal will either be 1 or 0. The signal is recorded in an input $\overline{EF3}$, and if $\overline{EF3}$ equals 1, then the instruction BN3 in the ROM 30 causes the logic to branch from B to E to another decision box 56 where instruction BN3 causes the logic to pass through branch F back to E and the logic is in an endless loop. The logic will remain in the loop until the logic causes the input $\overline{EF3}$ to change to 0.

Instruction BN3 at 38 will cause an incoming signal of 0 to pass from C to the decision box 58 where B3 instructions in the ROM 30 will pass the logic via branch D back to C; an endless loop. If the program is in the endless loop from F to E and there is motion causing $\overline{EF3}$ to change from 1 to 0, then the logic in the endless loop F to E can pass G and go on to the rest of the computer program. Similarly, if the starting signal is a 0 and goes positive (1) the program breaks out at E to the decision box 56 where it will now go into that endless loop. Thus, to release the program in the D to C loop takes two steps; $\overline{EF3}$ has to go positive (1) and then has to go negative (0). It will be appreciated that when there is motion these pulses come at a rapid pace. The control here provides for 15 poles or vanes on the Hall-effect rotor. So, if there is motion, the changes come thick and fast and the rest of the flow chart can come into play.

The next step is to enter the speed measurement loop designated 40 in FIG. 3 and depicted in detail in FIG. 5. The incoming logic from motion verification enters the processing box 60 where the ½ second timing register RB is decremented (i.e., decreased from some set number with each pass through the box 60) and the output is applied to the decision box 62 to determine whether the ½ second timing period has been finished. If yes, the logic exits at 78 and is applied to the decision box 80 in the flow chart shown in FIG. 6. If no, the program passes on to the timing loop director 64 which is set up to direct the signal to the RC=1 or RC=0 branch. Assume the pulse is applied to the RC=0 branch (it is initialized to so do); the program is applied to the decision box 66 and if the Hall-effect signal $\overline{EF3}$ equals 1, an instruction designated BN3 (stored in ROM) applies the logic to the processing box 68 which applies a signal to the loop director 64 to direct the next pulse into the RC=1 branch. Thus, it can be seen that if there is a positive voltage on the output of the Hall-effect switch ($\overline{EF3}$=1), the loop director is directed or prepared to pass the next pulse to the RC=1 branch. If, on the other hand, EF3 is negative, the logic goes to the "not operative" box (NOP) 70 which is placed in this circuit simply to keep the timing through either branch identical. This is done so that the decrementing of the RB register at the processing box 60 can remain constant. If the loop director RC is now 1 the next pulse RC1 will follow RC=1 to decision box 71. If $\overline{EF3}$=1 the logic directs the program to NOP 72 for return to 76. But if the EF3=0 the logic is directed through the processing box 74 which will now increment the count register R6 and direct the timing loop director 64 to use the RC=0 branch for the next pulse. Thus, the speed measurement loop increments the count by 1 when the EF3 signal or pulse goes from positive to negative (goes from 1 to 0). Then the measurement loop looks to the RC=0 branch for the signal going from 0 to 1 to prepare the loop director for the next count by switching the path or branch to RC=1.

After each passage through one of the paths 1 through 4 depicted in FIG. 5, the program goes back to the point 76 to start through the loop again. After counting pulses during a ½ second timing interval, the logic exits decision box 62 at 78 the current speed R6 is multiplied at box 80 (see FIG. 6) and the previous speed is put into memory at processing box 82. That memory is in the RAM 32. Now then, based on this, the previous and current speeds are compared at 84 to determine whether the speed is increasing or decreasing.

If the speed is decreasing, the program is directed to decision box 98 to determine if the speed is in excess of 5,900. If it is, the logic is simply passed through to the beginning point 37 in FIG. 3 between 36 and 38. If it is not, the program logic is applied to decision box 100 which applies the logic to the "stage 0" decision box 102 if the speed is greater than 3,900 rpm. At the "stage 0" box 102, the logic is passed to box 104 if there is no field weakening in effect. If the speed is over 4,000 rpm, decision box 104 directs the logic to processing box 106 to bring the field weakening into effect by applying a signal at 108 to close the relay contacts 54. If the speed is not over 4,000, everything should remain as is and therefore the program leaves the decision box 104 through the "else" exit and returns to the beginning 37.

If the logic enters the "stage 0" decision box 102 and the speed is greater than 3,900 rpm and field weakening is in effect, the logic is applied to box 110 which will direct continuation of the field weakening. This is simply a redundant fail safe. Going back to the decision box 100, if the speed is less than 3,900, the logic is applied to box 112 which determines if field weakening is in effect. If field weakening is in effect, the pulse is applied to processing box 114 to turn off the field weakening. If the field weakening is not in effect, the program exits at "else" and returns to the beginning. This, therefore, keeps field weakening in effect even with a decreasing speed which is nevertheless greater than 3,900 rpm and less than 5,900 rpm.

If the speed is increasing, the decision box 84 directs the program to decision box 86. If the current speed is greater than 4,000, the logic is directed to box 88 to determine if the speed is greater than 6,000 rpm. If it is, the system is in an overspeed condition and the logic is applied to processing box 90 to turn off the field weakening, that is, to open contacts 54 to reduce the speed of the motor. If at decision box 88 it is determined the speed is less than 6,000, the logic is applied to box 92. If the speed is over 5,900, the logic is passed back to the beginning point 37 leaving the system untouched. If it is less than 5,900, it is applied to the processing box 94 which dictates through output 96 that the field winding weakening will remain in effect. This is a fail safe direction.

This logic makes certain that field weakening is not effective if the speed is below 3,900 rpm. Field weakening is not made effective until the motor speed has gone above 4,000 rpm. At this point the field weakening becomes effective. If the speed increases above 6,000 rpm, field weakening will be cut out to prevent overspeed. When the speed subsequently drops below 5,900 rpm, the field weakening will be placed back into the circuit. If the speed drops below 3,900 rpm, the field weakening will be removed. The 100 rpm spread between making the field weakening effective (at 4,000) and ineffective (at 3,900) is equivalent to hysteresis in a mechanical system operating a switch. This prevents hunting. Similarly, the 100 rpm spread between 6,000 (removal of field weakening) and 5,900 rpm (restoration of field weakening) is another example of the electronic equivalent of hysteresis. It will be noted that the rpm count is multiplied so as to yield numbers which are easy to program into the memory. Thus, reprogramming for different response speeds is very simple since it needs no involved calculations to arrive at the correct number.

The speed is determined every ½ second and there is one passage through the flow chart of FIG. 6 every ½ second. So, changes to field weakening can be made every ½ second. The latest speed exits at 37 and is put into the "previous speed" register before box 38 in FIG. 3 and the counter for the timing loop is loaded for the ½ period.

If desired, additional stages of field weakening can be provided. This only involves an additional resistor (or more) with associated latch(es) and relay(s) and programing the computer and the ROM to look for additional speeds at which the resistors are put in the circuit in sequence. Each speed should have an associated lower speed to remove the resistor to avoid hunting or chatter.

We claim:

1. An electric vehicle driven by a DC motor, said vehicle having a field winding, an electric resistance element in circuit with said field winding, a switch in said circuit operative when closed to place said element in parallel with said field winding to weaken the field and increase potential motor speed, relay means for operating said switch, means to determine motor speed, computer means for determining whether the motor speed is increasing or decreasing, and means for operating said relay means to close said switch at a first speed but only if said motor speed is increasing and to actuate said switch at a second speed lower than said first speed but only if said switch has been closed previously and motor speed is decreasing.

2. An electric vehicle according to claim 1 in which said computer means determines motor speed in successive intervals and compares the motor speed in successive intervals to determine whether motor speed is increasing or decreasing.

3. An electric vehicle according to claim 2 in which said means for operating said relay means is responsive to a third speed greater than said first speed to operate said relay means to open said switch means, said switch means being closed continuously after closure at said first speed until opened at said second or said third speed.

4. An electric vehicle according to claim 3 in which said means for operating said relay means is responsive to a fourth speed lower than said third speed and greater than said first speed to operate said relay means to close said switch means only if subsequent to opening said switch at said third speed.

5. An electric vehicle driven by a DC motor, said vehicle having a field winding, an electric resistance element in circuit with said field winding, a switch in said circuit operative when closed to place said element in parallel with said field winding to weaken the field and increase potential motor speed, relay means for operating said switch, means responsive to motor rotation to produce voltage pulses indicative of motor speed, computer means operative to count pulses in a given time period to determine motor speed, comparison means for determining whether the motor speed is increasing or decreasing, said computer means being programed to operate said relay means to close said switch at a first speed but only if said motor speed is increasing and to actuate said switch at a second speed lower than said first speed but only if said switch has been closed previously and motor speed is decreasing.

6. An electric vehicle according to claim 5 in which said computer means is programed to respond to a third speed greater than said first speed to operate said relay means to open said switch means, and switch means being closed continuously after closure at said first speed until opened at said second or said third speed.

7. An electric vehicle according to claim 6 in which said computer means is programed to respond to a fourth speed lower than said third speed and greater than said first speed to operate said relay means to close said switch means only if subsequent to opening said switch at said third speed.

8. An electric vehicle according to claim 7 including means responsive to absence of voltage pulses indicative of motor rotation to block signal application to said pulse counting means.

9. An electric vehicle according to claim 8 in which said pulse producing means is a Hall-effect switch including a rotating element connected to said motor.

10. An electric vehicle according to claim 9 in which said comparison means includes means comparing the present motor speed with the motor speed determined in the immediately prior time period.

11. An electric vehicle according to claim 10 in which said computer is programed to operate said switch at said second speed only if said switch is closed and the motor speed decreases to said second speed.

12. An electric vehicle according to claim 11 in which said computer is programed to operate said switch at said fourth speed only if the motor speed is decreasing and said switch is open.

* * * * *